Patented Aug. 31, 1943

2,328,430

UNITED STATES PATENT OFFICE 2,328,430

PRODUCTION OF VINYL CHLORIDE

Ralph W. Dornte, Alplaus, N. Y., assignor to General Electric Company, a corporation of New York No Drawing. Application February 16, 1942, Serial No. 431,132

3 Claims. (Cl. 260—656)

The present invention relates to an improved process for the production of vinyl chloride from generator gas produced by subjecting a hydrocarbon oil to the action of electric arc or arcs.

It has been known that vinyl chloride may be prepared by saturating acetylene and hydrogen chloride with mercury and then contacting the reactant gases with a catalyst of activated carbon. Difficulty has been encountered, however, in the process due to the fact that gas obtained from the electric-arc process contains certain compounds which act as catalytic poisons. It has been proposed to remove these poisonous elements by refrigerating the generator gas at a temperature of the order of —80° C. but this has proven not entirely satisfactory. Moreover, while the usual catalyst employed in reacting acetylene with hydrogen chloride to form vinyl chloride, for example mercuric chloride supported on a porous body, functions satisfactorily with pure acetylene and hydrogen chloride, such catalysts have serious limitations when used with a gaseous mixture obtained by subjecting a hydrocarbon oil to the action of an electric arc or arcs. For convenience such a mixture will be termed herein as generator gas. The generator gas contains in addition to the acetylene a high percentage, for example about 50–60% hydrogen. The instability of mercuric chloride in the presence of hydrogen probably is one cause of the difficulties which are experienced with such catalyst.

I have discovered that the foregoing difficulties are obviated by first treating the generator gas to remove the catalytic poisons and then contacting the reactants with a specially prepared catalyst. My invention, therefore, includes not only an improved process for preparing the vinyl chloride but also an improved catalyst for the reaction and a method of preparing such catalyst.

In order to illustrate my invention the following detailed description of the process for producing vinyl chloride including the process of preparing the improved catalyst for the reaction is given.

The gases employed in the process may be generated for example by the operation of electric arcs between particles of carbon in oil as described and claimed, for example, in the copending application of Chauncey G. Suits, Serial No. 380,640, filed February 26, 1941, and assigned to the same assignee as the present invention. Such a gas contains a relatively high percentage, approximately 25–30% by volume of acetylene and 50–60% by volume of hydrogen, the balance consisting of acetylenics, olefines, saturated hydrocarbons, hydrogen sulfide and other sulfur compounds.

The generator gas first is subjected to a purification process to remove components which are active poisons for the catalyst. Although it is not definitely known which components of the gas mixture are the poisonous elements for the catalyst used in the process, sulfur compounds have been identified among the poisonous elements. However, it is known that it is extremely important to remove these poisonous components before the reactants are allowed to come in contact with the catalyst.

In order to purify the gaseous product it is scrubbed with a dilute alkaline solution, for example a 20% sodium hydroxide solution or its equivalent, and then dried by conducting it over a deliquescent material such as solid sodium hydroxide, calcium chloride, etc. Finally, the gaseous mixture is passed over an activated adsorbent material which is capable of being regenerated, such as activated alumina, silica gel and the like.

Instead of refrigerating the gas at —78° C., as heretofore proposed which involves potential hazards, and also apparently does not remove entirely all of the poisonous elements due to limitations arising from the vapor pressure of the condensible poisons, I have found that when the gas is passed at 20° C. over any suitable activated carbon such as industrial activated carbon, cocoanut charcoal, etc., prior to contact with the catalyst for the reaction, these poisonous elements are completely removed. Thus, for example, I have found that one volume of activated carbon (6–8 mesh) removes all the condensible poisons from 490 volumes of generator gas. The adsorptive capacity of the activated carbon may be regenerated by heating under vacuum at a temperature of 200–400° C., any acetylene which may have been adsorbed, being desorbed and returned, if desired, to the gas generator.

The gas so purified is now ready for reaction with anhydrous hydrogen chloride. In order to effect this reaction a specially prepared catalyst is employed. An example of the preparation of the catalyst follows:

Twelve (12) liters of 6–8 mesh of an activated carbon is dried by heating under a vacuum (1–10 mm.) at 300–400° C. The average time for carrying out this drying operation is of the order of 10 hours. The activated carbon then is saturated with mercury at 200° C. by distilling the mercury through the catalyst tube containing the carbon and while under vacuum. The activated carbon then is treated at 135–200° C. for an average time of about 4 hours with a stream of anhydrous hydrogen chloride which causes the formation in situ upon the activated carbon particles of mercurous and mercuric chlorides.

The reactants, generator gas and anhydrous hydrogen chloride, preferably in stoichiometric proportions based on acetylene content, are passed over metallic mercury at 100 to 135° C. before contact with the catalyst, and then passed over the prepared catalyst at 150 to 160° C. For example, with a flow of 13 liters per minute a 99% conversion to vinyl chloride is obtained while a 96% conversion to vinyl chloride results with a gas rate of 21 liters per minute. This is a marked improvement over prior art processes since the present invention provides a 96 to 99% conversion with a gas rate of from two to four times that known or indicated in the prior art.

The efficiency of the process, and the catalyst in particular, is indicated by the almost negligible amount of acetylene in the exhaust gas. For example, with a flow of from 9 to 10 liters per minute of generator gas only 0.1% to 0.2% of acetylene is found in the exhaust gas and an excess of about 200 cubic centimeters of hydrogen per minute. The high activity of the catalyst is indicated by the temperature rise at the inlet to 200° C. in spite of the air cooling on this section of the catalyst while the remainder of the catalyst is held at 130 to 150° C. by electric heating. Similar results are obtained with a gas rate of 18 liters per minute which gives only 0.1% to 0.3% acetylene in the exhaust from the catalyst.

What I claim as new and desire to secure by Letters Patent of the United States is:

1. The process of producing vinyl chloride from generator gas produced by subjecting a hydrocarbon oil to the action of electric arcs, which comprises scrubbing said generator gas, drying the gas, conducting the gas over an activated carbon to remove condensible catalytic poisons, mixing the purified gas with anhydrous hydrogen chloride, passing this gas mixture over heated metallic mercury and finally over a catalyst comprising an activated carbon saturated with mercury and containing mercurous and mercuric chlorides formed in situ on the surface of the activated carbon.

2. The process of producing vinyl chloride from generator gas produced by subjecting a hydrocarbon oil to the action of electric arcs, which comprises scrubbing said generator gas with 20% NaOH solution, drying the scrubbed gas by first passing it over solid NaOH and then over activated alumina, conducting the gas so scrubbed and dried over an activated carbon to remove condensible catalytic poisons, mixing the purified gas with anhydrous hydrogen chloride, passing this gas mixture over heated metallic mercury and finally over a catalyst comprising an activated carbon saturated with mercury and containing mercurous and mercuric chlorides formed in situ on the surface of the activated carbon.

3. The process of preparing a catalyst for use in producing vinyl chloride from hydrogen chloride and generator gas produced by subjecting a hydrocarbon oil to the action of electric arcs, which comprises heating an activated carbon under vacuum at elevated temperature, distilling mercury through the heated carbon under vacuum until the carbon is saturated with mercury and passing anhydrous hydrogen chloride through the carbon-mercury mixture to form in situ mercurous and mercuric chlorides on the surfaces of the carbon particles.

RALPH W. DORNTE.